Figure 1:
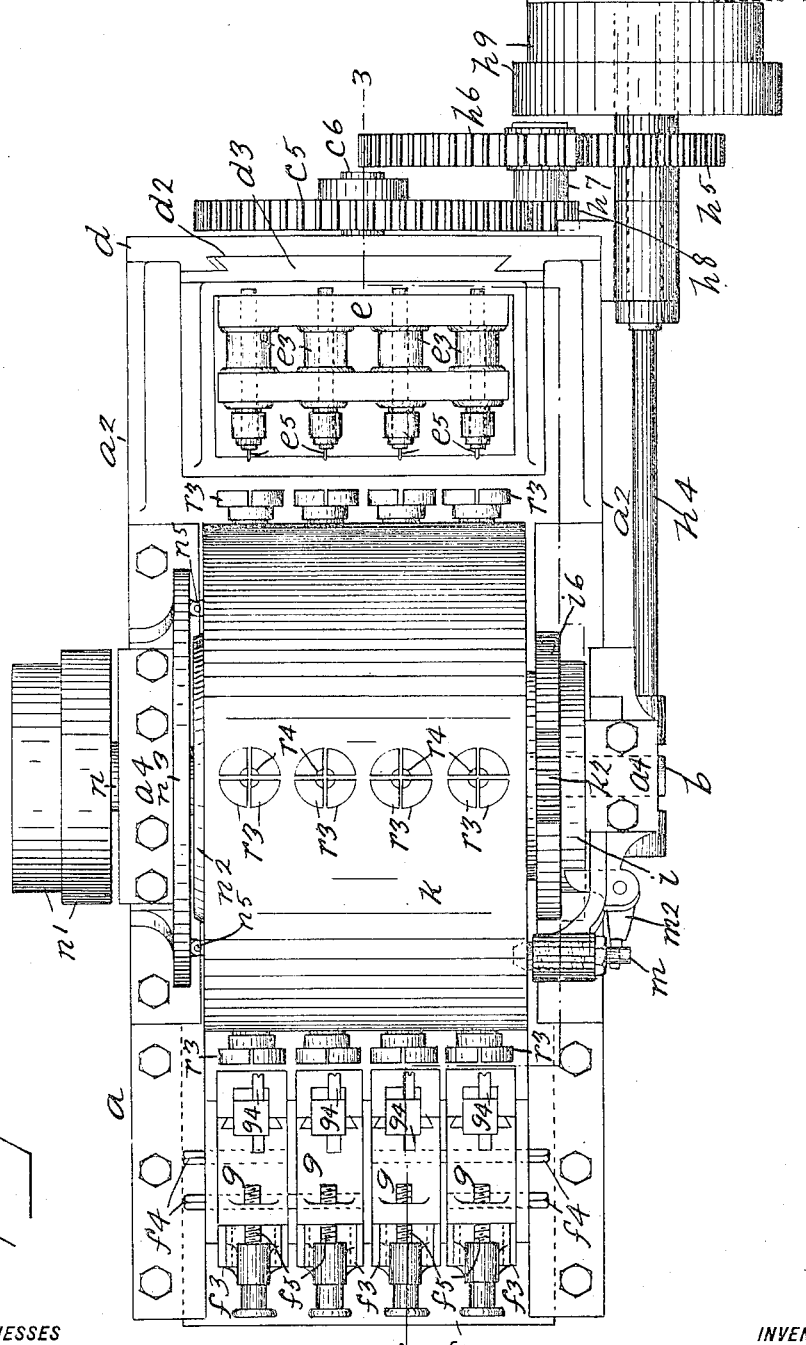

No. 839,740. PATENTED DEC. 25, 1906.
H. B. EMBLER & E. D. W. ROSE.
BUTTON MAKING MACHINE.
APPLICATION FILED JUNE 17, 1905.

7 SHEETS—SHEET 1.

WITNESSES
J. C. Larsen
F. A. Stewart

INVENTORS
Elbert D. W. Rose
Harry B. Embler
BY
Edg---
ATTORNEYS

No. 839,740. PATENTED DEC. 25, 1906.
H. B. EMBLER & E. D. W. ROSE.
BUTTON MAKING MACHINE.
APPLICATION FILED JUNE 17, 1905.

7 SHEETS—SHEET 3.

WITNESSES
J C Larsen
F A Stewart

INVENTORS
Elbert D. W. Rose
Harry B. Embler
BY
Edgar Tate & Co
ATTORNEYS

No. 839,740. PATENTED DEC. 25, 1906.
H. B. EMBLER & E. D. W. ROSE.
BUTTON MAKING MACHINE.
APPLICATION FILED JUNE 17, 1905.

7 SHEETS—SHEET 5.

WITNESSES
J. B. Larsen
F. A. Stewart

INVENTORS
Elbert D. W. Rose
Harry B. Embler
BY
Edgar Tutti & Co
ATTORNEYS

No. 839,740. PATENTED DEC. 25, 1906.
H. B. EMBLER & E. D. W. ROSE.
BUTTON MAKING MACHINE.
APPLICATION FILED JUNE 17, 1905.

7 SHEETS—SHEET 6.

WITNESSES
J. C. Larsen
F. A. Stewart

INVENTORS
Elbert D. W. Rose
Harry B. Embler
BY
Edgar Tate & Co
ATTORNEYS

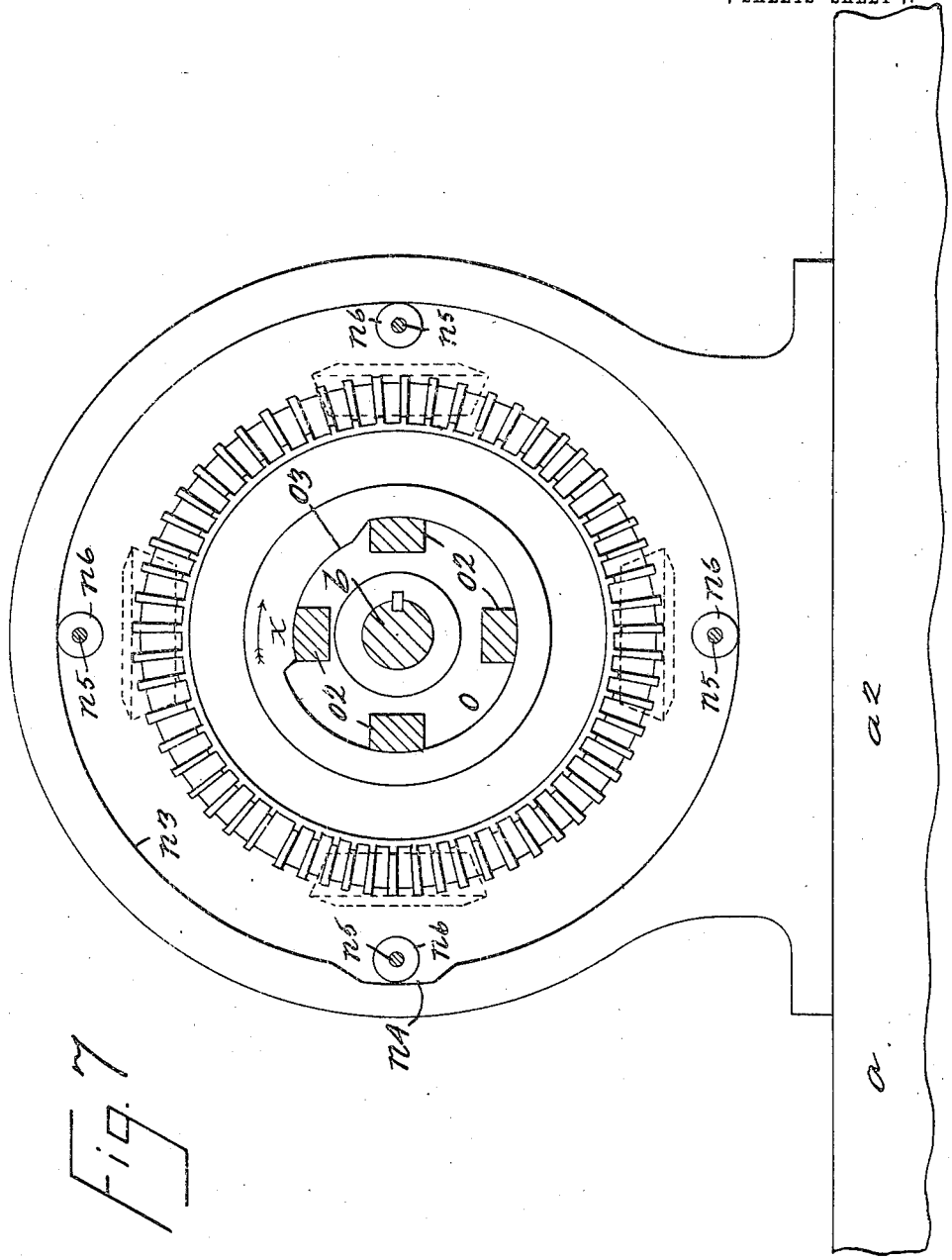

UNITED STATES PATENT OFFICE.

HARRY B. EMBLER AND ELBERT D. W. ROSE, OF ROSETON, NEW YORK, ASSIGNORS, BY MESNE ASSIGNMENTS, TO SAID ROSE.

BUTTON-MAKING MACHINE.

No. 839,740.     Specification of Letters Patent.     Patented Dec. 25, 1906.

Application filed June 17, 1905. Serial No. 265,636.

*To all whom it may concern:*

Be it known that we, HARRY B. EMBLER and ELBERT D. W. ROSE, citizens of the United States, residing at Roseton, in the county of Orange and State of New York, have invented certain new and useful Improvements in Button-Making Machines, of which the following is a specification, such as will enable those skilled in the art to which it appertains to make and use the same.

The object of this invention is to provide a machine for manufacturing buttons of pearl, ivory, bone, and the like from suitable blanks, said machine being adapted to engage and hold said blanks during the process of forming them into buttons and also during the process of drilling holes therethrough, a further object being to provide a machine of this class whereby a plurality of button-blanks may be engaged and carried to a position for forming and when in said position be rapidly rotated and during said rotation be cut to the desired shape and size and after said operation of forming to be carried to a position for drilling, in which position a plurality of regularly-spaced thread-holes may be automatically drilled therethrough, a still further object being to provide a machine of this class wherein the cutting and drilling devices are operated only when the blanks are in position for being operated upon and which also automatically releases said buttons when formed and drilled, thereby being in position for the insertion of other blanks, and also to provide a machine of the class hereinafter described and claimed which is comparatively simple in construction and operation and well adapted for the purpose for which it is intended.

The invention is fully disclosed in the following specification, of which the accompanying drawings form a part, in which the separate parts of our improvement are designated by suitable reference characters in each of the views, and in which—

Figure 2:
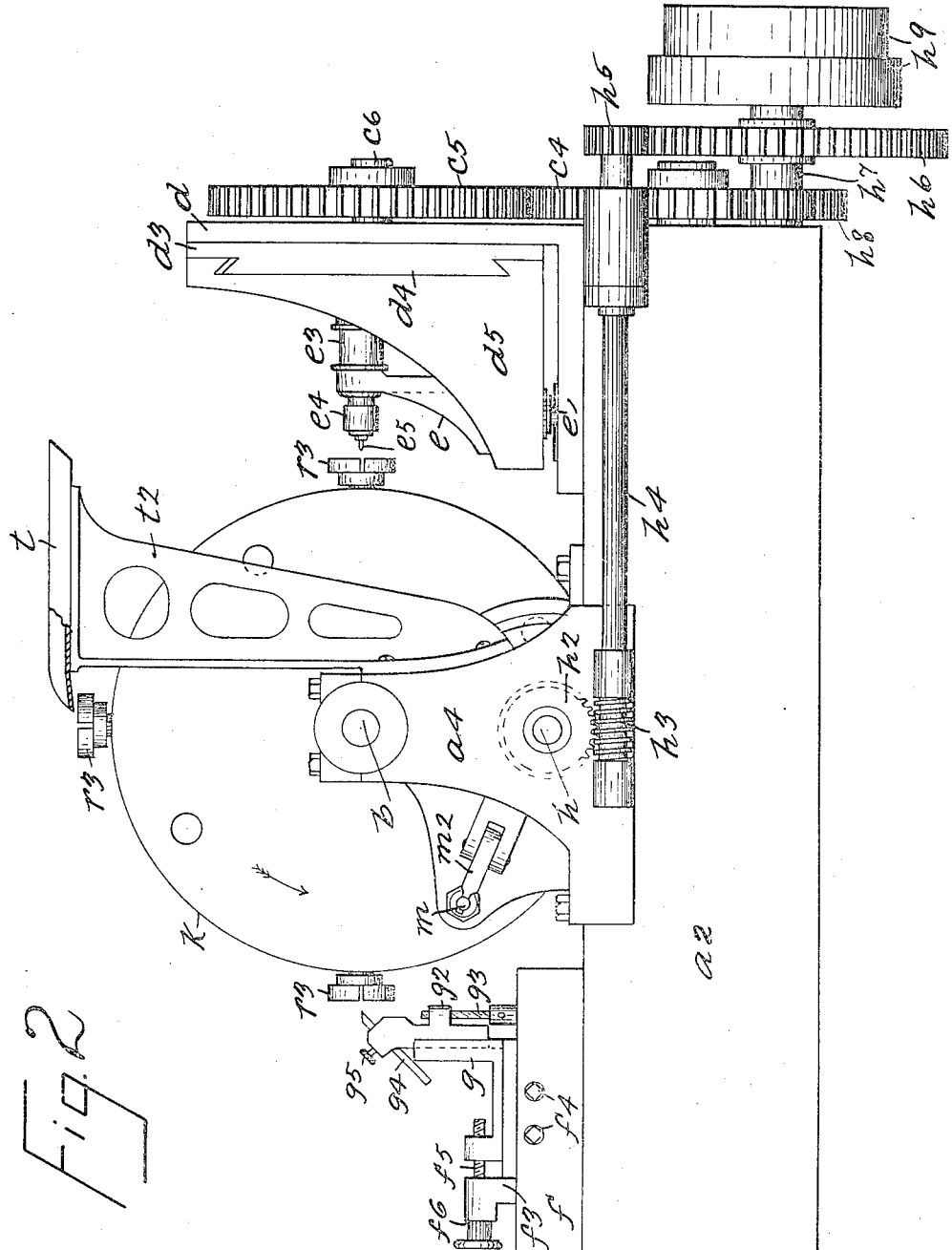
Figure 3:
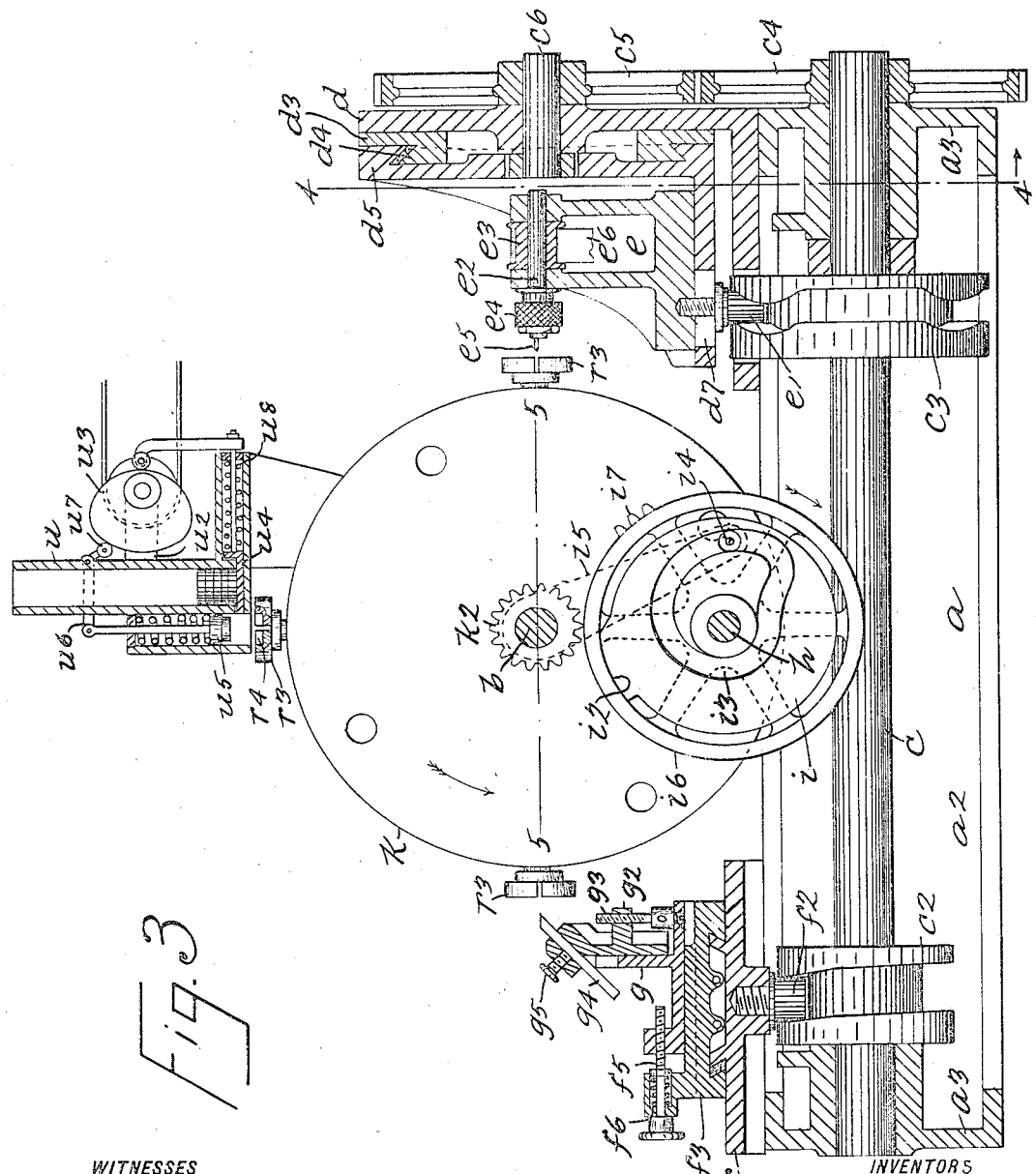
Figure 4:
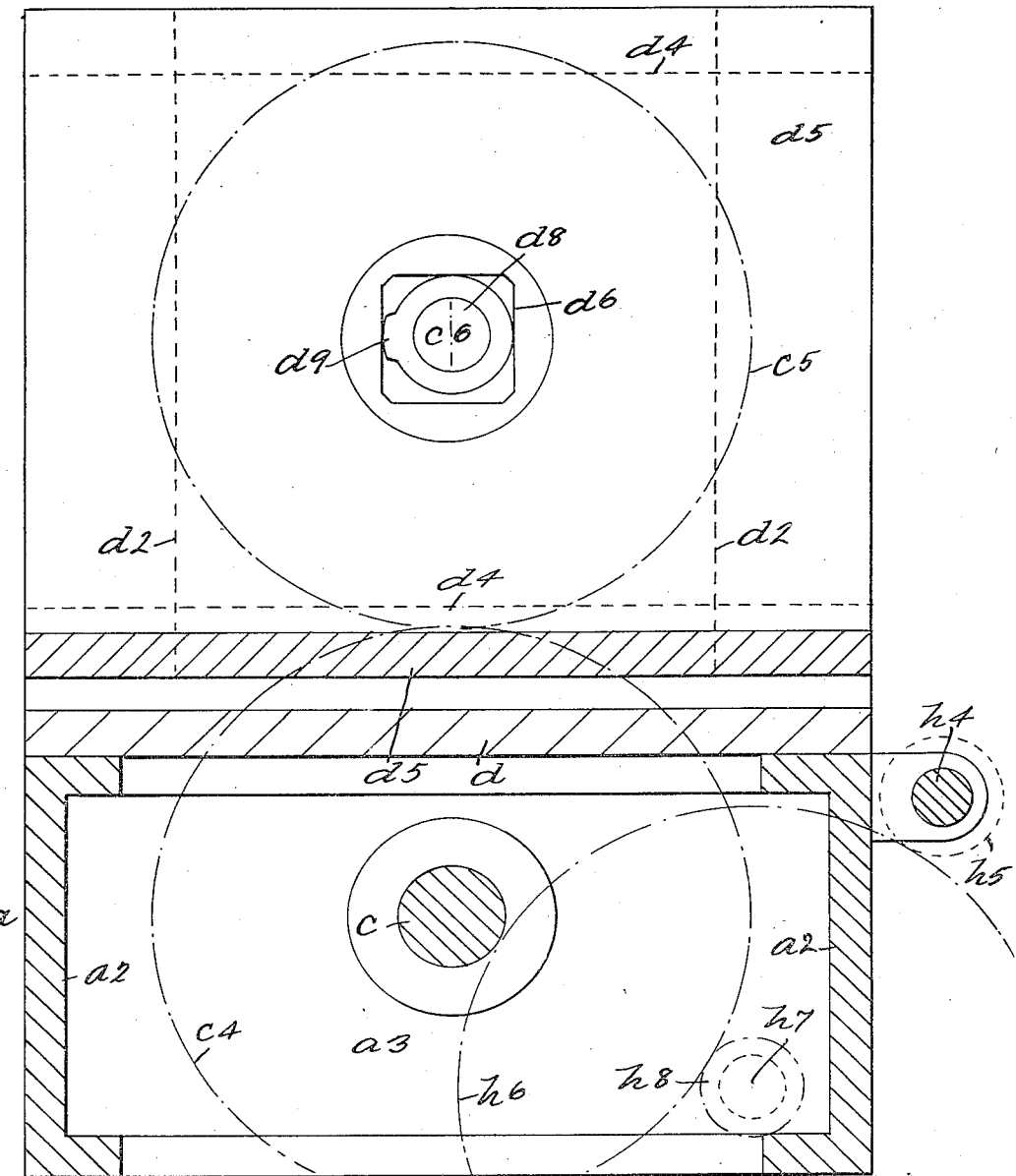
Figure 5:
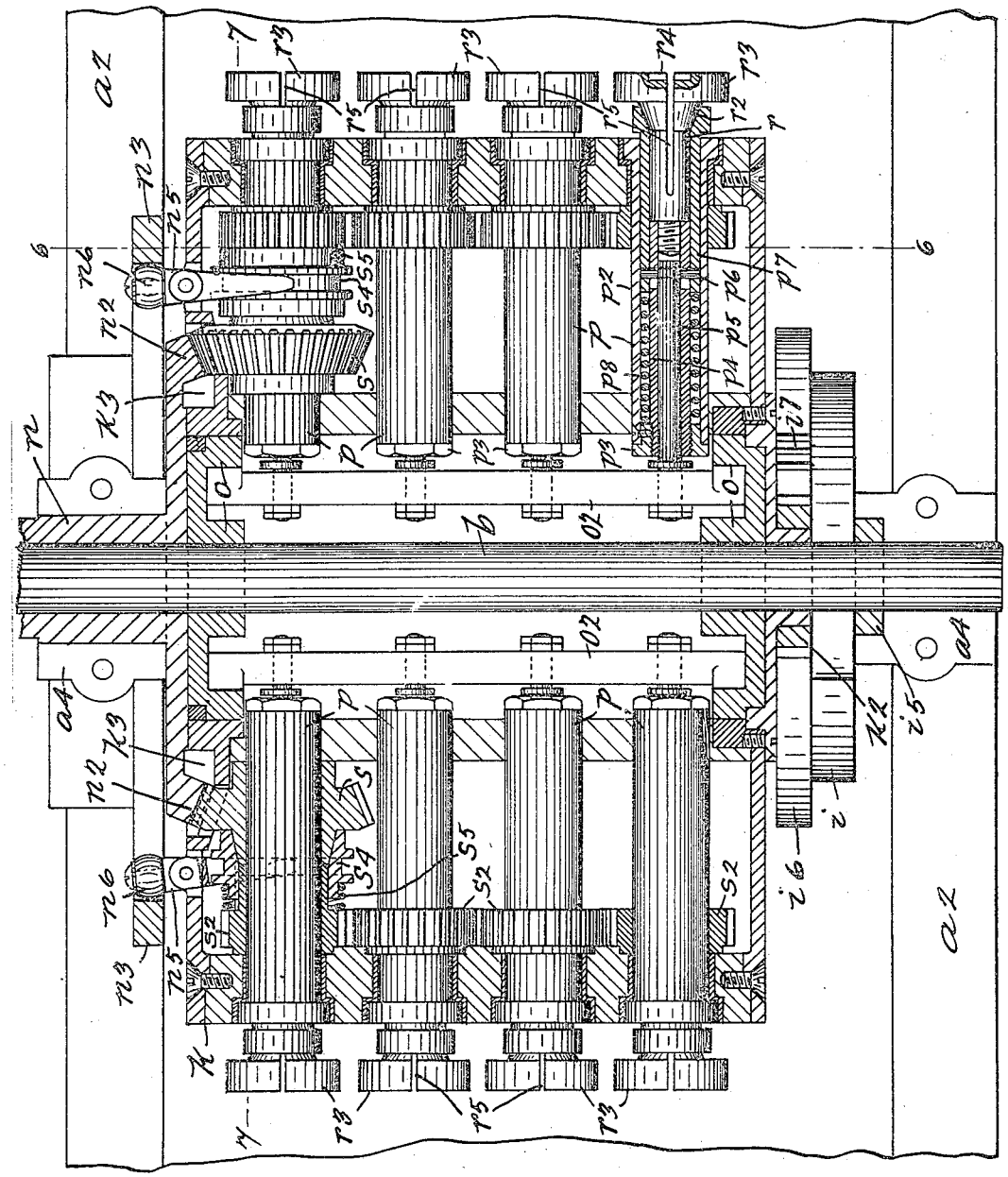
Figure 6:
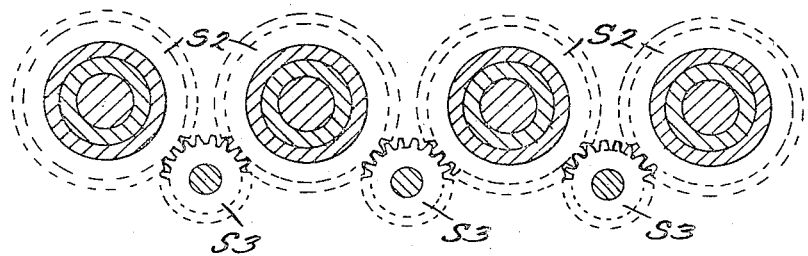

Figure 1 is a plan view of a button-making machine constructed according to our invention; Fig. 2, a side elevation thereof; Fig. 3, a longitudinal vertical section on the line 3 3 of Fig. 2; Fig. 4, a transverse vertical section on the line 4 4 of Fig. 3; Fig. 5, a horizontal section on the line 5 5 of Fig. 3; Fig. 6, a partial section on the line 6 6 of Fig. 5; Fig. 7, a partial section on the line 7 7 of Fig. 5, and Fig. 8 a detail view of one of the parts of our machine.

In the drawings forming part of this specification we have shown a base $a$, comprising longitudinally-arranged side members $a^2$ and transverse end members $a^3$, and arranged centrally of the side members $a^2$ are supports $a^4$, adapted to receive a shaft $b$, which is rotatably mounted therein.

Arranged centrally and longitudinally in the base $a$ is a shaft $c$, which carries two cam-disks $c^2$ and $c^3$ within the base $a$, and a gear-wheel $c^4$ at the rearward end of said base, said gear-wheel meshing with a similar gear-wheel $c^5$, secured to a shaft $c^6$, rotatably mounted in a frame or support $d$, secured to the top of the base $a$ at the rearward end thereof, and the gear-wheels $c^4$ and $c^5$ are of the same dimension and have the same number of teeth, and it will be seen from this construction that the rotation of the shaft $c$ rotates the shaft $c^6$ correspondingly.

As shown in Fig. 1, the frame or support $d$ is provided with a bevel-edged recess $d^2$, in which is slidably mounted a vertically-movable plate $d^3$, and the plate $d^3$ is provided with a bevel-edged projection, the beveled edges of which are horizontally arranged or at right angles to the bevel edges in the support $d$, and slidably mounted on the bevel-edged projection $d^4$ is a carrier $d^5$, provided with a substantially square opening $d^6$ in the center thereof, and slidably mounted on the carrier $d^5$ is a frame $e$, which is provided with a downwardly-directed headed bolt $e'$, engaged by the groove of the cam-disk $c^3$ and slidable in a slot $d^7$ of the carrier $d^5$, and the groove of the cam-disk $c^3$ is provided with four offsets, thereby moving the frame $e$ longitudinally of the base $a$ in one rotation of the shaft $c$.

Secured to the shaft $c^6$ and operating within the square opening $d^6$ of the carrier $d^5$ is a disk $d^8$, which is provided with an offset $d^9$ on one edge of its periphery, and as will be seen from the construction already described the carrier $d^5$ is vertically and horizontally movable, and said movement is accomplished by means of the offset $d^9$ striking against the inner surfaces of the opening $d^6$ in said carrier, said offset moving the carrier to the right or left or upwardly in either of its right or left positions and downwardly in either of its right or left positions, thereby producing a movement of the carrier $d^5$ corresponding to an equal lateral parallelogram, and it will also be seen that one rotation of the shaft $c^6$ moves the carrier $d^5$ into its four positive positions.

The frame $e$ carries at its top a plurality of rotatable shafts $e^2$, to each of which is secured a pulley $e^3$, and to the outer or forward ends of the shafts $e^2$ are secured chucks $e^4$, in each of which is firmly held a drill $e^5$, and the pulleys $e^3$ are adapted to be operated by a belt $e^6$, connected with any suitable part of the machine or exteriorly in order that all may be moved in unison, and when the shaft $c$ is rotated through one revolution it will be seen that the drills $e^5$ are carried forwardly and backwardly four times, each of said forward and backward movements being accomplished in one of the four positions of the carrier $d^5$.

Mounted on the base $a$, at the end opposite to the drill-frame $e$, is a slide $f$, which is operated longitudinally of the base $a$ by means of the groove in the cam-disk $c^2$, in which a headed bolt $f^2$ of the slide $f$ operates, this backward-and-forward movement being accomplished once only during a complete rotation of the shaft $c$, and movable transversely of and on the slide $f$ are a plurality of plates $f^3$, each of which is adapted to be adjusted by means of screws $f^4$, one of which is provided for each of said plates $f^3$, as is clearly shown in Fig. 1, and each of said plates is also provided with a screw-threaded longitudinally-arranged rod $f^5$, which is normally forced forwardly by means of a spring $f^6$, mounted in the plate $f^3$, and the screw-threaded end of the bolt $f^5$ engages a frame $g$, in which is mounted a vertically-movable member $g^2$, adapted to be movable vertically by means of a screw-threaded bolt $g^3$, and the member $g^2$ carries at its top a blade or cutter $g^4$, adjustably mounted therein and secured thereto by means of thumb-screws $g^5$, and by means of this construction it will be seen that the member $g^2$ of the frame $g$ is vertically adjustable and the frame $g$ is longitudinally adjustable on the plate $f^3$ and the plate $f^3$ is transversely adjustable on the slide $f$, and said slide $f$ is adapted to be moved longitudinally by means of the cam-disk $c^2$.

Rotatably mounted in one of the supports $a^4$ is a shaft $h$, provided with a worm gear-wheel $h^2$, which is adapted to be rotated by means of a worm $h^3$, arranged on a shaft $h^4$, mounted outside of the base $a$, and the shaft $h^4$ is provided with a pinion $h^5$ at its outer end, said pinion being enmeshed with a gear-wheel $h^6$, mounted on a shaft $h^7$, which also carries a pinion $h^8$, which is enmeshed with the gear-wheel $c^4$, all of which is diagrammatically shown in Fig. 4, and connected with either the shaft $h^7$ or the shaft $h^4$ are pulleys $h^9$, with which the usual belt may be connected for operating the same, and when said pulleys are rotated in the operation of the machine it will be seen that the shafts $c$, $c^6$, $h^4$, and $h^7$ are rotated correspondingly.

Figure 8:
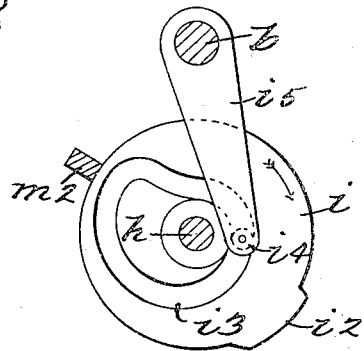

Secured to the shaft $h$, within the support $a^4$, is a cam-disk $i$, provided with an offset $i^2$ in its periphery, and the disk $i$ is also provided with a cam-groove $i^3$, as is clearly shown in Figs. 3 and 8, and an antifriction-roller $i^4$, mounted on an arm $i^5$, secured to the shaft $b$, operates in the cam-groove $i^3$ of the disk $i$, and when the shaft $h^4$ is operated the shaft $h$ is also operated, the ratio of said rotation being four rotations of the shaft $h^4$ to one rotation of the shaft $h$, and the shaft $h$ is also provided with a wheel $i^6$, which carries a segment-gear $i^7$ on its periphery, and said segment-gear is rotated at the same speed as the cam-disk $i$.

Rotatably mounted on the shaft $b$ is an annular casing $k$, which is provided with a pinion $k^2$ at the end adjacent to the segment-gear $i^7$, and said segment-gear is adapted to operate said pinion $k^2$, and thereby said casing $k$, said operation occurring intermittently and through a predetermined arc of a circle, said arc being preferably, in the form of construction shown, ninety degrees of a circle, and in Fig. 1 we have shown a lock in engagement with the casing $k$ for holding the same in any of its four positions, said lock comprising a spring-operated plunger $m$, with which is connected a toggle-lever $m^2$, which projects over the cam-disk $i$ and bears thereon, and when the offset $i^2$ of the cam-disk $i$ reaches the toggle-lever $m^2$ said lever is operated and the plunger $m$ is forced outwardly and out of engagement with the casing $k$, and said casing is free to be rotated, and from the relation of the segment-gear $i^7$ to the offset $i^2$, as clearly shown in Fig. 3, it will be seen that the plunger $m$ is withdrawn just before the segment-gear $i^7$ reaches the pinion $k^2$, and in the further rotation of the segment-gear $i^7$ the casing $k$ is moved through an arc of ninety degrees, as previously stated.

Rotatably mounted on the shaft $b$, at the end opposite the pinion $h^2$, is a sleeve $n$, to which are secured pulleys $n'$, which are adapted to be operated by means of a belt in the usual manner, said rotation of the sleeve $n$ being accomplished independently of the shaft $b$ and independently of the casing $k$, as will be readily seen, and secured to the sleeve $n$ and operating in a recess $k^3$ of the casing $k$ is a bevel gear-wheel $n^2$, which in the operation of our machine is continually in motion, and secured to the base $a$, outside of but adjacent to the bevel gear-wheel $n^2$, is an internal cam $n^3$, provided with an offset $n^4$ at one point thereof, said point being preferably on the horizontal plane of the shaft $b$, for reasons hereinafter described, and pivotally connected with the casing $k$ at predetermined points are levers $n^5$, which carry rollers $n^6$ at their outer ends, there being four of the levers $n^5$ and rollers $n^6$, as shown in Fig. 7, and the rollers $n^6$ operate in the cam-disk $n^3$, as is clearly shown in said figure.

Secured to the shaft $b$, within the casing $k$ and at each side thereof, are two internal cam-disks $o$, which are similar to each other, and these cam-disks are adapted to be operated by the shaft $b$, and said shaft $b$ is oscillated, as previously described, by means of the arms $i^5$, secured thereto, and the cam-groove $i^3$ in the cam-disk $i$, and, as shown in Fig. 7, four transversely-arranged bars $o^2$ extend between and into the cams $o$ and are operated thereby, and the cams $o$ are provided, as shown in Fig. 7, with a portion $o^3$ of a smaller radius than that of the balance of said cam, and the bars $o^2$ are adapted to be curved inwardly and outwardly in the oscillation of said cam-disk $o$.

Arranged in suitable supports in the casing $k$ and in predetermined positions are a plurality of blank-holders $p$, which, as shown in the drawings, are four in number in each of the four positions thereof, and each of said holders comprises a tube $p^2$, provided with a cap $p^3$ at its inner end and being open at its outer end, and secured in the cap $p^3$ is a sleeve $p^4$, mounted on a rod $p^5$, which is provided adjacent to its outer end with a pin $p^6$, which passes through slots in the sleeve $p^4$ and into a tube $p^7$, which is provided with an inwardly-beveled opening at its outer end, and secured in the sleeve $p^4$ at its outer end is a head $r$, which is provided with an inclined or cone-shaped neck portion $r^2$ and with a disk $r^3$, and the head $r$ is slotted, as shown at $r^5$, in opposite directions, thereby quartering the disk $r^3$, as well as most of the head $r$, thereby permitting an inward and outward movement of each of the four sections of the disk $r^3$ so obtained, and the disk $r^3$ is also provided with a recess $r^4$, which is adapted to receive one of the button-blanks, and the inner ends of all of the rods $p^5$ are rotatably mounted in the transversely-arranged bars $o^2$, and when said bars $o^2$ are moved by means of the cam-disks $o$ the tubes $p^7$ are moved against the operation of coil-spring $p^8$, and the inward movement of the tubes $p^7$ permit the outward movement of the four members of the head $r$, and the outward movement of the tubes $p^7$, operating on the beveled neck member of the head $r$, forces the members thereof inwardly, and thereby firmly holds the blanks contained in the recess $r^4$, and each set of four holders are connected with a corresponding one of the transverse bars $o^2$ and are operated by the said bars in unison. Loosely mounted on each holder of each of said sets of holders adjacent to the gear-wheel $n^2$ is a bevel-gear $s$, which is always in rotation during the operation of our machine, and secured to each of said holders is a gear-wheel $s^2$, as shown in Fig. 6, by means of free wheels $s^3$, rotatably mounted in the casing $k$, and the gear-wheels $s^2$ are thereby rotated at the same speed and in the same direction, and keyed to suitable collars on the gear-wheels $s^2$ of the holders upon which the bevel-gears $s$ rotate are clutches $s^4$, which are normally forced inwardly by means of strong coil-springs $s^5$ into engagement with the bevel-gears $s$, and the clutches $s^4$ are adapted to be moved backwardly by means of the levers $n^5$, which are in engagement therewith, said levers being operated by means of the cam $n^3$, and it will be seen from this construction that when the clutch $s^4$ engages the corresponding bevel-gear $s$ all of that set of holders $p$ are rotated; but because of the position of the offset $n^4$ of the cam $m^3$ said rotation of the holders $p$ occurs only when the heads $r$ of each of said sets are in line with and adjacent to the cutter-blades $g^4$, and when the roller $n^6$ of the lever $n^5$ is again forced inwardly the clutch $s^4$ is released from the bevel-gear $s$ and the rotation of the holders $p$ of that particular set ceases.

In Fig. 2 of the drawings we have shown a table $t$, mounted on suitable supports $t^2$, secured to the supports $a^4$, and the inner edge of the said table is adjacent to the vertical plane of the shaft $b$, and said table is adapted to hold the button-blanks which are adapted to be removed therefrom into the heads $r$ of the holders $p$ manually, this operation being performed when the casing $k$ is in one of its locked positions, at which time the heads of the set of holders arranged vertically above the shaft $b$ are in their distended positions, because of the fact that the corresponding bar $o^2$ is drawn inwardly by the offset $o^3$ of the cams $o$, and the heads of the set of holders arranged horizontally and to the right of the shaft $b$ are closed, because of the fact that the corresponding bar $o^2$ is in its outward position, and just previous to the unlocking of the casing $k$ and its rotation through an arc of ninety degrees from its position the shaft $b$ is operated by means of the arm $i^5$, as previously described, and the cams $o$ are oscillated in the direction of the arrow $x$, as shown in Fig. 7, at which time the bar $o^2$ of the set of holders last described is drawn inwardly, and thereby distending of the jaw of the holders of said set and permitting the buttons to drop out, and the bar $o^2$ of the vertically-arranged set is permitted to be forced outwardly after having passed the offset $o^3$ by means of the coil-springs $p^8$, and the jaws of the holder-heads are contracted thereby and firmly grasp the blanks at the same instant that the finished buttons are being dropped out the horizontally-arranged set of holders, after which the said set of holders are carried through an arc of ninety degrees, and the casing $k$ is again locked in position.

When the blanks just described as having been fed into the holders of the vertically-arranged holders reach a position adjacent to the cutter-blades $g^4$, the casing $k$ is locked, the cam $c^2$ moves the slide $f$ forwardly, and thereby the cutter-blades $g^4$ against the said blanks, the clutch $s^4$ engages the bevel-gear $s$ of this set, and the holders of said set are rapidly rotated, after which the slide $f$ is moved backwardly, and the casing $k$ is again unlocked and rotated through an arc of ninety degrees, at which time the formed blanks are arranged beneath the shaft $b$, and a new set of blanks having been fed into the successive set of holders said blanks have been carried to a position adjacent to the cutter-blades $g^4$, and the second set of blanks is formed and a new set of blanks is fed into the second successive set of holders, after which the casing $k$ is again rotated through an arc of ninety degrees, which brings the first set of formed blanks to a position adjacent to the drills $e^5$.

When the casing $k$ has been locked in the position just described, the cam $c^3$ moves the drill-frame $e$ forwardly, and as the shafts $e^2$ therein are continually rotated by means of the belt $e^6$ or by any other suitable means the drills $e^5$ are forced into the formed or turned blanks and are withdrawn therefrom, at which time the carrier $d^5$ is moved into all of its four positions, and the drills $e^5$ are again forced through the formed blanks, and this forward-and-backward movement of the drills $e^5$ through the formed blanks is accomplished in each of the our positions of the carrier $d^5$, thereby drilling four holes in each of the formed blanks, and thereby finishing the buttons, and just after the drilling rotation of the carrier $d^5$ the said finished buttons are released from the heads of the holders and are dropped therefrom into any suitable receptacle or chute.

In Fig. 3 of the drawings we have shown an automatic blank-feeding mechanism which is arranged directly over the upwardly vertically-arranged set of holders and comprises a cylindrical receptacle $u$, in which the blanks are placed, and rotatable in an arm $u^2$, secured to the receptacle $u$, is a cam-disk $u^3$, which operates a slide $u^4$, arranged beneath the receptacle $u$, and arranged directly over the head $r$ of the holders is a spring-operated vertically-movable plunger $u^5$, which is moved upwardly by means of the arm $u^6$, which carries an antifriction-roller $u^7$, which is operated by the cam-disk $u^3$, and when the said cam-disk is rotated the slide $u^4$ is drawn backwardly, thereby permitting the blanks to drop, and in the forward movement of the slide $u^4$, occasioned by means of the coil-spring $u^8$, one of the blanks is carried to a position over the head $r$ of the holders, which are at this time in their distended positions, at which time the plunger $u^5$ descends and forces the said blanks into the recess $r^4$ of the head $r$, after which time the jaws of the head $r$ are contracted, thereby grasping the blanks, and the members of the feeding mechanism assume their normal position, and this operation is adapted to be repeated as often as a new set of holders reach a position adjacent to the said feeding mechanism; but it will be understood that any other suitable feeding mechanism may be employed for this purpose.

By means of this description it will be seen that a set of button-blanks are adapted to be engaged by one of a plurality of sets of holders arranged on a rotatably-mounted cylinder, and said button-blanks after being firmly locked in said holders are carried to a predetermined position, where they are rapidly rotated, and at the same time a corresponding number of cutter-blades are forced against the said blanks, and after the said blanks are formed the cutter-blades are withdrawn and the casing is carried through a predetermined arc of a circle and again locked, after which said formed blanks are carried to a position adjacent to a drilling mechanism, where a predetermined number of holes are drilled therethrough, after which the said finished blanks or buttons are released from said holders and are removed from said machine in any suitable manner, and this operation is repeated as often as desired with each set of blank-holders employed in said casing.

While we have shown but four sets of blank-holders arranged in our machine, it will be apparent that any number of sets may be employed and any number of holders in each of said sets may be employed, and various means for actuating the casing, the cutter-blades, or the drilling mechanism may be employed, and various other changes in and modifications of the construction herein shown and described may be made without departing from the spirit of our invention or sacrificing its advantages.

Having fully described our invention, what we claim as new, and desire to secure by Letters Patent, is—

1. In a button-making machine, the combination with a main frame of a rotatably-mounted casing, a plurality of button-blank holders arranged in sets in said casing, devices for rotating said casing through a predetermined arc of a circle intermittently, devices for locking the same in each of said positions, cutting-tools adjacent to one of said positions of each of said sets of holders, devices for rotating the holders of said sets in said last-named position, and devices for drilling said button-blank holders and thereby finishing said buttons, comprising a backwardly and forwardly movable frame, drills rotatable in said frame and devices for moving said frame vertically and horizontally, substantially as shown and described.

2. In a button-making machine, a casing, a plurality of sets of blank-holders arranged therein, devices for rotating said casing to predetermined positions intermittently, and devices for rotating one of said sets of holders in each position of said casing, comprising gear-wheels mounted on each of said holders of each of said sets, a beveled gear projecting into said casing, a beveled gear secured to the adjacent holder of each of said sets and in engagement with said first-named beveled gear, a friction-clutch mounted on each of said last-named holders and a cam arranged externally of said casing and adapted to operate the corresponding clutch when each of said sets of holders reaches a predetermined position, substantially as shown and described.

3. In a button-making machine, a casing, a plurality of sets of blank-holders arranged therein, a shaft passing through said casing and rotatable independently thereof, external devices for rotating said casing intermittently through predetermined arcs of a circle, a bar connected with each of said sets of blank-holders, cams secured to said shaft and in operative connection with said bars, and external devices for oscillating said shaft at predetermined intervals, and thereby opening or closing said blank-holders, substantially as shown and described.

4. In a button-making machine, a casing rotatable intermittently through predetermined arcs of a circle, a plurality of blank-holders arranged in sets in said casing, a shaft passing through said casing and independent thereof, a bevel-gear rotatable on said shaft and extending into said casing, a bevel-gear mounted on the adjacent one of each of said sets of holders and in permanent connection with said bevel-gear, a cam adjacent to said casing, clutches in operative connection with said bevel-gears whereby said holders may be rotated, said clutches being adapted to be operated by said cam, and means for insuring the rotation of all the holders in each of said sets when the one in operative connection with said bevel-gear is rotated, substantially as shown and described.

5. In a button-making machine, a rotatably-mounted casing, a plurality of blank-holders therein, a shaft passing through said casing and movable independently thereof, a cam secured to said shaft at each end of said casing, a bar secured to said holders and adapted to be operated by said cams, and devices for oscillating said shaft, comprising an arm secured to said shaft and a cam for operating said arm, substantially as shown and described.

6. In a button-making machine, a casing rotatable intermittently through predetermined arcs of a circle, a plurality of blank-holders arranged in sets in said casing, each of said holders being provided with collapsible jaws, a shaft passing through said casing, a cam secured to said shaft at each end of said casing, devices in operative connection with said jaws of said holders and operated by said cams, and external devices for operating said shaft, substantially as shown and described.

7. In a button-making machine, the combination with a main frame of a rotatable casing, a plurality of sets of blank-holders arranged therein, devices for rotating one of said sets of holders in different positions of said casing comprising gear-wheels mounted on each of said holders of each of said sets, a bevel-gear projecting into said casing, a bevel-gear secured to the adjacent holder of each of said sets and in engagement with the first-named bevel-gear, a friction-clutch mounted on each of said last-named holders, and a cam arranged eccentrically of said casing and adapted to operate a corresponding clutch when each of said sets of holders reaches a predetermined position, substantially as shown and described.

In testimony that we claim the foregoing as our invention we have signed our names, in presence of the subscribing witnesses, this 15th day of June, 1905.

HARRY B. EMBLER.
ELBERT D. W. ROSE.

Witnesses:
PETER CANTLINE,
K. M. SEEGER.